(12) United States Patent
Hsu et al.

(10) Patent No.: US 9,585,008 B2
(45) Date of Patent: Feb. 28, 2017

(54) APPARATUS AND METHODS FOR SIGNALING OUT-OF-STANDARD CAPABILITY IN WIRELESS COMMUNICATION NETWORKS

(71) Applicant: QUALCOMM Incorporated, San Diego, CA (US)

(72) Inventors: Liangchi Hsu, San Diego, CA (US); Sitaramanjaneyulu Kanamarlapudi, San Diego, CA (US); Sunil Suresh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 14/083,053

(22) Filed: Nov. 18, 2013

(65) Prior Publication Data

US 2014/0313988 A1    Oct. 23, 2014

Related U.S. Application Data

(60) Provisional application No. 61/813,788, filed on Apr. 19, 2013.

(51) Int. Cl.
*H04W 8/24* (2009.01)
*H04W 8/22* (2009.01)
*H04W 24/02* (2009.01)

(52) U.S. Cl.
CPC ............. *H04W 8/24* (2013.01); *H04W 8/22* (2013.01); *H04W 24/02* (2013.01)

(58) Field of Classification Search
CPC .......... H04W 8/24; H04W 24/02; H04W 4/00; H04W 4/001; H04W 8/00; H04W 8/18; H04W 8/22; H04W 68/00; H04L 61/00; H04L 12/24; H04L 12/16; H04L 41/00; H04L 41/02; H04L 41/08; H04L 41/0803
See application file for complete search history.

(56) References Cited

U.S. PATENT DOCUMENTS

| 8,300,583 | B2 | 10/2012 | Chun et al. | |
| 8,498,284 | B2 | 7/2013 | Pani et al. | |
| 2004/0037327 | A1* | 2/2004 | Torsner | H04W 24/00 370/517 |

(Continued)

FOREIGN PATENT DOCUMENTS

| EP | 1720365 A1 | 11/2006 |
| EP | 2026523 A1 | 2/2009 |

OTHER PUBLICATIONS

International Search Report and Written Opinion—PCT/US2014/031356—ISA/EPO—Sep. 10, 2014.

(Continued)

*Primary Examiner* — Benjamin H Elliott, IV
(74) *Attorney, Agent, or Firm* — Loza & Loza LLP

(57) ABSTRACT

Aspects of the present disclosure provide a number of approaches to deploy out-of-standard (or proprietary) features/enhancements that are not supported in the current communication standards. A mobile terminal and a network can mutually agree to support certain out-of-standard features/enhancements, and communicate support of such out-of-standard or non-standard features/enhancements by adapting or repurposing currently unused (or reserved) signaling data.

26 Claims, 14 Drawing Sheets

(56) References Cited

U.S. PATENT DOCUMENTS

| | | | |
|---|---|---|---|
| 2004/0100918 A1 | 5/2004 | Toskala et al. | |
| 2005/0048969 A1 | 3/2005 | Shaheen et al. | |
| 2009/0054038 A1* | 2/2009 | Ranjan | G06F 21/6209 |
| | | | 455/412.1 |
| 2009/0074088 A1* | 3/2009 | Tao | H04L 1/0007 |
| | | | 375/260 |
| 2009/0098892 A1 | 4/2009 | Trogolo et al. | |
| 2010/0121974 A1* | 5/2010 | Einarsson | H04L 47/10 |
| | | | 709/231 |
| 2010/0278111 A1 | 11/2010 | Kashima et al. | |
| 2011/0086656 A1* | 4/2011 | Zhou | 455/507 |
| 2012/0129541 A1* | 5/2012 | Sfar | 455/452.1 |
| 2013/0184024 A1* | 7/2013 | Chen | H04W 76/023 |
| | | | 455/509 |
| 2013/0297894 A1* | 11/2013 | Cohen | G06F 3/0679 |
| | | | 711/154 |
| 2013/0322370 A1* | 12/2013 | Fong et al. | 370/329 |
| 2013/0322435 A1* | 12/2013 | Wood | H04L 49/90 |
| | | | 370/389 |

OTHER PUBLICATIONS

Nokia Siemens Networks ., et al., "Extended PDCP PDU formats", 3GPP Draft, R2-101257 Extended PDCP PDU Formats, 3rd Generation Partnership Project (3GPP), Mobile Competence Centre , 650, Route Des Lucioles, F-06921 Sophia-Antipolis Cedex, France, vol. RAN WG2, No. San Francisco, USA, 20100222-20100226, Feb. 16, 2010 (Feb. 16, 2010), XP050605011, pp. 1-3, [retrieved on Feb. 16, 2010] section 2.2.

Partial International Search Report—PCT/US2014/031356—ISA/EPO—Jul. 21, 2014.

* cited by examiner

APPARATUS AND METHODS FOR SIGNALING OUT-OF-STANDARD CAPABILITY IN WIRELESS COMMUNICATION NETWORKS

CROSS-REFERENCE TO RELATED APPLICATIONS

This application claims priority to and the benefit of U.S. provisional patent application No. 61/813,788 filed in the United States Patent and Trademark Office on Apr. 19, 2013, the entire content of which is incorporated herein by reference.

TECHNICAL FIELD

Aspects of the present disclosure relate generally to wireless communication systems, and more particularly, to mechanism of signaling non-standard capability in a wireless communication network.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In the UMTS standards, signaling between a user equipment (UE) (also referred to as a mobile station, wireless terminal, mobile terminal, etc.) and a UTRAN is the information exchange concerning the establishment and control of the telecommunication channels and the management of the network. For signaling purposes, a lot of information is transmitted between the UE and UTRAN. The signaling between the UE and UTRAN is carried out using the radio interface protocols defined in the 3GPP standards. These radio interface protocols include the Media Access Control (MAC) protocol, the Radio Link Control (RLC) protocol, the Packet Data Convergence Protocol (PDCP), the broadcast/multicast control protocol, the multimedia broadcast multicast control protocol, and the Radio Resource Control (RRC) protocol. In order to ensure interoperability of equipment produced by different vendors, the UE and UTRAN generally are designed to communicate with each other in accordance with the signaling protocols defined and sanctioned in the current 3GPP standards.

As the demand for mobile broadband access continues to increase, research and development continue to advance the UMTS technologies not only to meet the growing demand for mobile broadband access, but to advance and enhance the user experience with mobile communications. However, it is generally very time consuming to amend or update the 3GPP standards to introduce new features because it will involve multiple parties and complicated procedures.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a number of approaches to deploy out-of-standard (or proprietary) features/enhancements that are not supported in the current communication standards. Mobile terminal and network equipment vendors can mutually agree to support certain out-of-standard features/enhancements. By the approaches to be described fully below, the mobile terminal can signal its support of such out-of-standard or non-standard features/enhancements to the network, or vice versa, by adapting or repurposing currently unused (or reserved) signaling data, and the network can recognize such adapted or repurposed signaling data, without interfering with any legitimate signaling.

In one aspect, the disclosure provides a method of signaling in a wireless communication network. A first network entity transmits an enhanced capability and configuration message that conforms with a communication standard to a second network entity. A data field of the enhanced capability and configuration message is configured to provide a first function according to the communication standard, and a second function for communicating information related to at least one mutually agreed feature that is different from features defined in the communication standard.

Another aspect of the disclosure provides a method of signaling in a wireless communication network. A user equipment transmits a device identification number to a network in accordance with a communication standard. The network includes a database of device identification numbers each indicating at least one feature supported by a corresponding user equipment with the same identification number. The at least one feature is different from features defined in the communication standard. The UE and/or network enables the supported feature in response to a match of the device identification number in the database.

Another aspect of the disclosure provides an apparatus for wireless communication. The apparatus includes at least one processor, a communication interface coupled to the at least one processor, and a memory coupled to the at least one processor. The at least one processor includes a number of circuitries configured to perform various functions. The processor included first circuitry configured to transmit an enhanced capability and configuration message that conforms with a communication standard to a network entity. A data field of the enhanced capability and configuration message is configured to provide a first function according to the communication standard, and a second function for communicating information related to at least one mutually agreed feature that is different from features defined in the communication standard.

Another aspect of the disclosure provides a user equipment for wireless communication. The user equipment includes at least one processor, a communication interface coupled to the at least one processor, and a memory coupled to the at least one processor. The at least one processor includes a number of circuitries configured to perform various function. The processor includes first circuitry configured to transmit a device identification number from the user equipment to a network in accordance with a communication standard. The network includes a database of device identification numbers each indicating at least one feature supported by a corresponding user equipment with the same identification number. The processor further includes second circuitry configured to enable the supported feature in response to a match of the device identification number in the database, wherein the at least one feature is different from features defined in the communication standard.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide a number of approaches to deploy out-of-standard (or proprietary) features/enhancements that are not supported in the current communication standards. Mobile terminal and network equipment vendors can mutually agree to support certain out-of-standard features/enhancements. By the approaches to be described fully below, the mobile terminal can signal its support of such out-of-standard or non-standard features/enhancements to the network by adapting currently unused (or reserved) signaling data, and the network can recognize such adapted or repurposed signaling data, without interfering with any legitimate signaling. These approaches are also designed to minimize or avoid forward-compatibility risk.

In one aspect of the disclosure, a first network entity (e.g., a mobile terminal) transmits a protocol data unit (PDU) to a second network entity (e.g., a network) in accordance with a communication standard. The standard may correspond to a Universal Terrestrial Radio Access Network (UTRAN), an evolved UMTS Terrestrial Radio Access Network (e-UTRAN), a GSM EDGE Radio Access Network (GERAN), a CDMA2000 radio access network (RAN), or any other suitable wireless communication network, and the PDU may be configured to conform with the applicable standard. In an aspect of the present disclosure, a data field of the PDU may be configured to support a first function conforming to the communication standard, and a second function for communicating support of at least one mutually agreed feature that is different from features defined in the communication standard. In a further aspect of the disclosure, the second function is not supported or defined in the communication standard.

Figure 1:
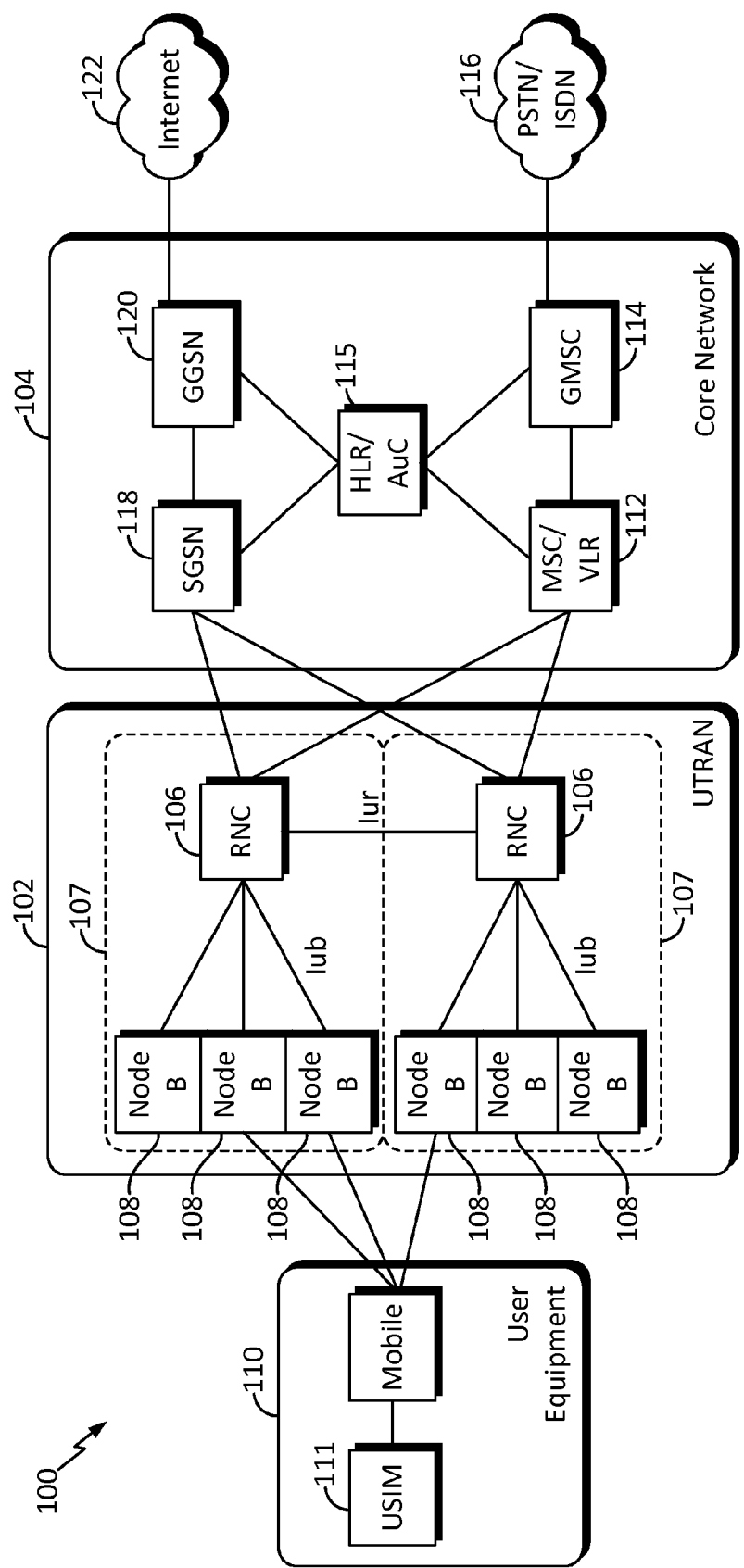
FIG. 1 is a block diagram conceptually illustrating an example of a telecommunications system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

A high speed packet access (HSPA) air interface includes a series of enhancements to the 3G/W-CDMA air interface between the UE 110 and the UTRAN 102, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

Figure 2:
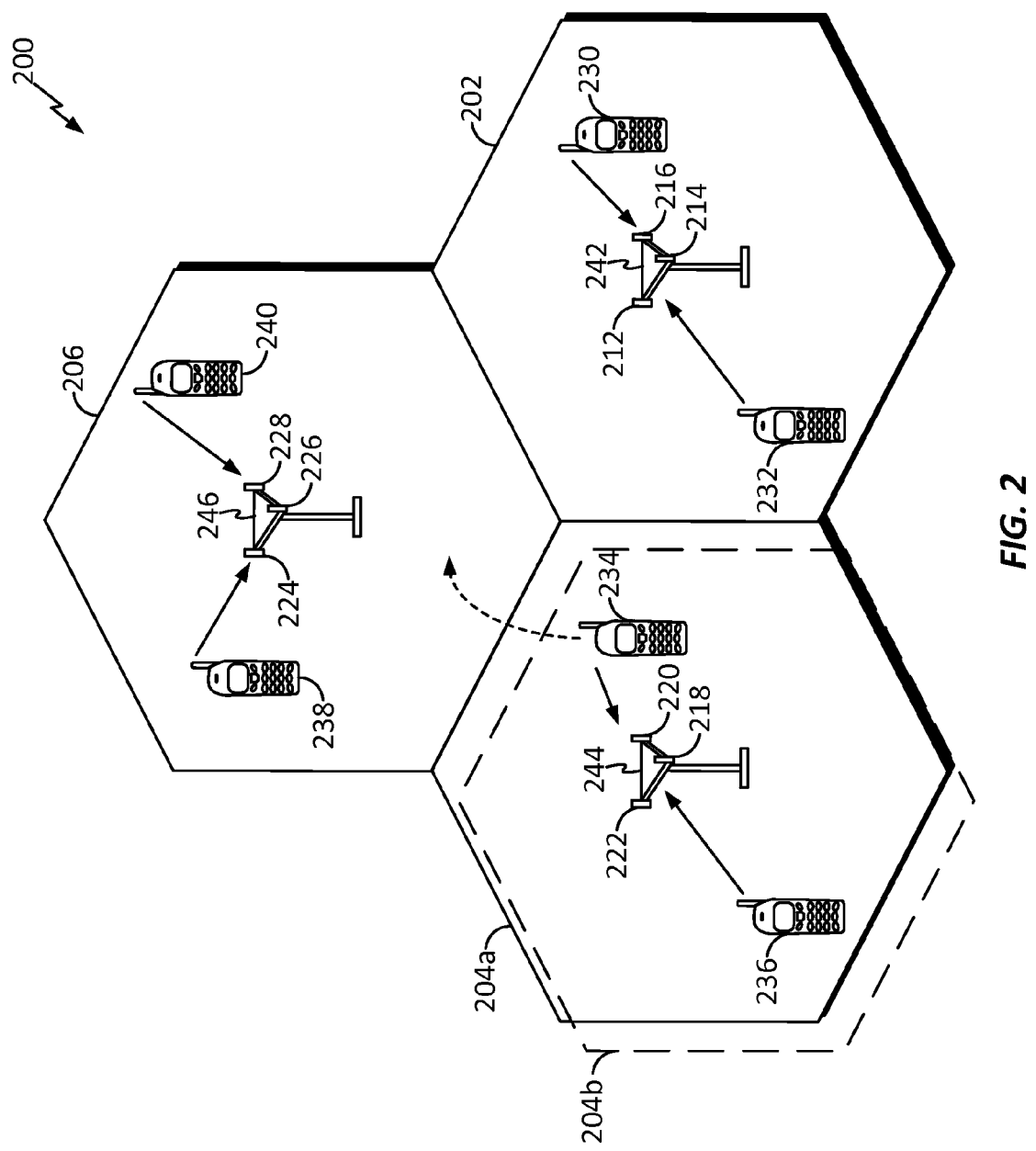
FIG. 2 is a conceptual diagram illustrating an example of an access network.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 204 (see FIG. 2) for all the UEs 230, 232, 234, 236, 238, and 240 in the respective cells 202, 204, and 206.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
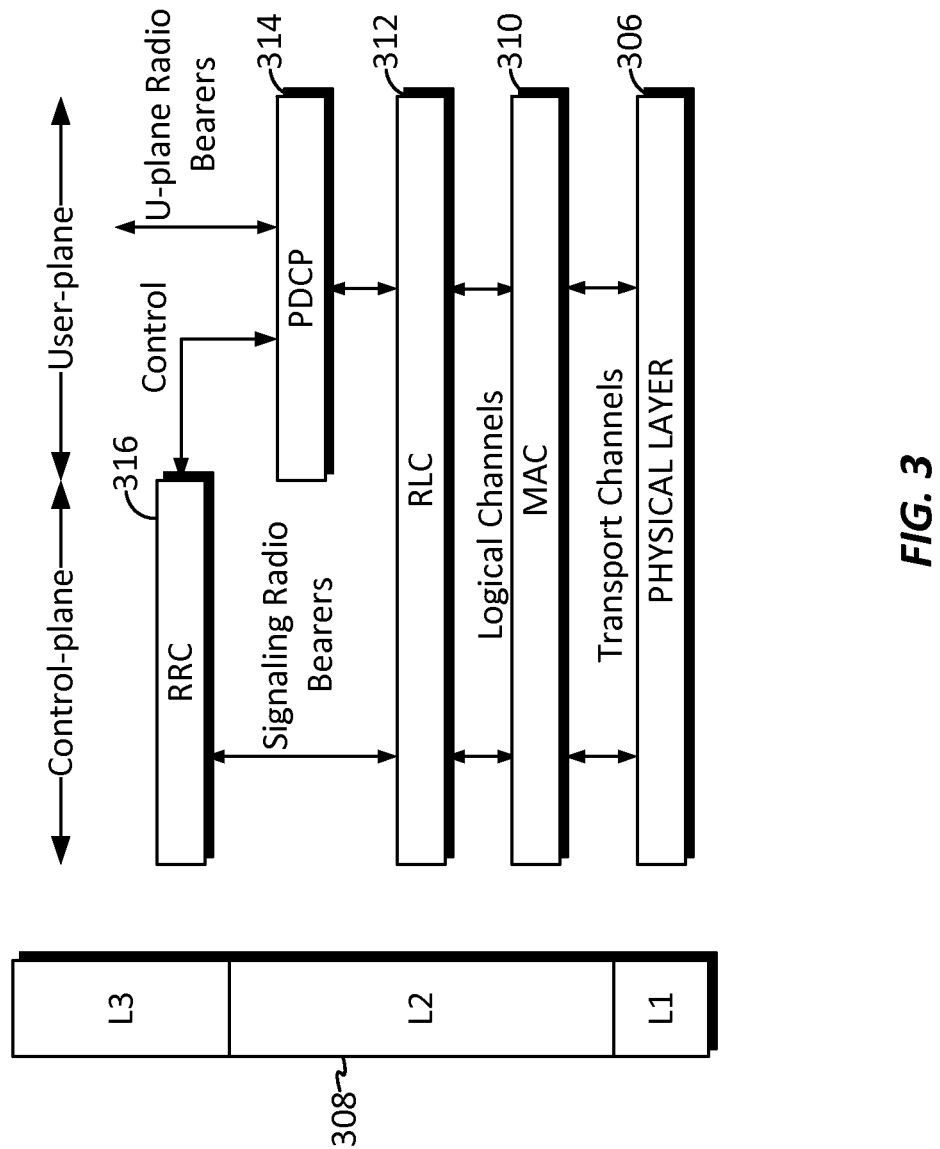
FIG. 3 is a conceptual diagram illustrating an example of a radio protocol architecture for the user and control plane.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between the UE 210 and Node B 208 over the physical layer 306.

At Layer 3, the RRC layer 316 handles the control plane signaling between the UE 210 and the Node B 208. RRC layer 316 includes a number of functional entities for routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a media access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations. The MAC sublayer 310 includes various MAC entities, including but not limited to a MAC-d entity and MAC-hs/ehs entity. The Radio Network Controller (RNC) houses protocol layers from MAC-d and above. For the high speed channels, the MAC-hs/ehs layer is housed in the Node B.

From the UE side, The MAC-d entity is configured to control access to all the dedicated transport channels, to a MAC-c/sh/m entity, and to the MAC-hs/ehs entity. Further, from the UE side, the MAC-hs/ehs entity is configured to handle the HSDPA specific functions and control access to the HS-DSCH transport channel. Upper layers configure which of the two entities, MAC-hs or MAC-ehs, is to be applied to handle HS-DSCH functionality.

In a first aspect of the disclosure, a UE 110 may communicate its support of out-of-standard (non-standard sanctioned) features/enhancements by sending an uplink RLC acknowledged mode (AM) or unacknowledged mode (UM) data protocol data unit (PDU) with special padding bits. The UE 110 communicates with the network (e.g., UTRAN 102) in accordance with the UTRAN standard. However, the UE may communicate with the network in accordance with other standards such as e-UTRAN, GERAN, CDMA2000 RAN standards, etc. The out-of-standard (non-standard sanctioned) features/enhancements refer to any features/enhancements that are not defined or supported in the communication standard by which the UE 110 communicates with the network (e.g., UTRAN 102).

Figure 4:
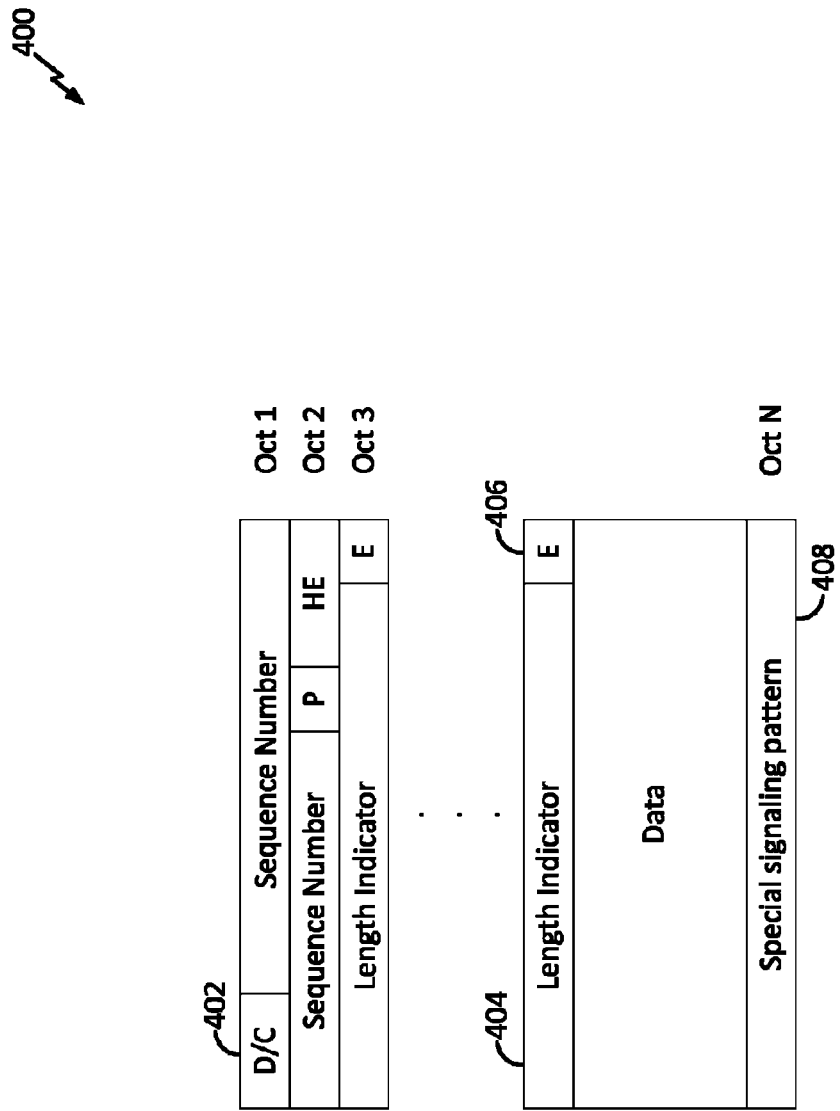
FIG. 4 is a conceptual diagram illustrating a Radio Link Control (RCL) data protocol data unit (PDU) with a data field repurposed to signal support of out-of-standard features/enhancements in accordance with an aspect of the disclosure.

FIG. 4 is a conceptual diagram illustrating an RLC AM data PDU 400 with a data field repurposed to signal support of out-of-standard features/enhancements in accordance with an aspect of the disclosure. The RLC PDU 400 includes a number of data fields such as a D/C bit 402, a Length Indicator 404, an E bit 406, and a PAD field 408. When data concatenation is not applicable and the remaining data to be transmitted do not fill an entire RLC PDU of a given size, the remainder of the data field is filled with padding bits in the PAD field 408. In one example, to indicate the support of out-of-standard features, these fields may be set as follows.

D/C bit=1 (Data PDU).

Length Indicator (LI)="1111111" (7-bit) or "111111111111111" (15-bit)

"E" bit=1 attached to the last "Length Indicator". This bit is used by the receiver to avoid unnecessary "special signaling/PAD pattern" checking.

The PAD field 408 contains a special signaling pattern (padding bits) that identifies the out-of-standard features/enhancements supported by the UE 110. The UE and the network (e.g., UTRAN 102) both need to mutually agree and recognize this special signaling pattern. In the network, a radio network controller (RNC) 106 receives the specially padded RLC data PDU 400 and decodes the special signaling pattern to determine the out-of-standard features/enhancements supported by the UE. In other words, the PAD field 408 is repurposed to communicate the out-of-standard features/enhancements between the UE and the network. In various aspects of the disclosure, the non-standard signaling approach illustrated in FIG. 4 may be applied in both RLC AM and UM data PDUs in both uplink (UL) and downlink (DL) directions to communicate out-of-standard features/enhancements between the UE and the network.

Figure 5:
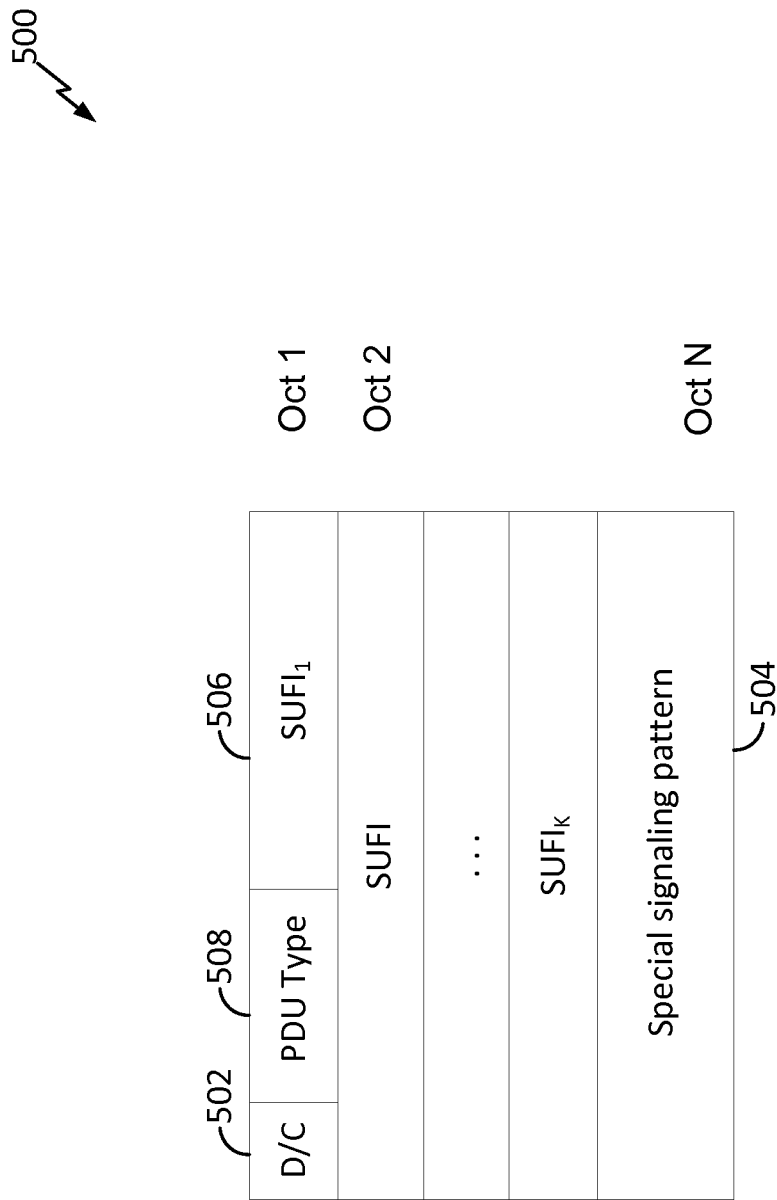
FIG. 5 is a conceptual diagram illustrating an RLC status PDU with a data field repurposed to signal support of out-of-standard features/enhancements in accordance with an aspect of the disclosure.

In a second aspect of the disclosure, the UE 110 may communicate its support of out-of-standard (non-standard sanctioned) features/enhancements by transmitting an uplink RLC (or piggybacked) status PDU with special padding bits. FIG. 5 is a conceptual diagram illustrating an uplink RLC status PDU 500 with a data field repurposed to signal support of out-of-standard features/enhancements in accordance with an aspect of the disclosure. An RLC status PDU is used by the RLC transmitting entity to request its peer receiving entity to move the reception window. It is also used by the RLC receiving entity to notify the transmitting peer about missing and received PDUs. In this example, the D/C field 502 is set to zero to indicate that this is a control PDU. The PAD field 504 contains a special signaling pattern (padding bits) to signal the supported out-of-standard features/enhancements, their relevant commands, and their relevant parameters.

The RLC status PDU 500 contains one or more SUFIs fields 506. The SUFIs carry information about successfully and unsuccessfully received PDUs and window sizes. Each SUFI is divided into a type field, a length field, and a value field. The length field describes the length of the value field, which contains status information defined by the type field. In this example, the SUFI type can be any suitable types, e.g., NO_MORE data, ACK, etc.

Figure 6:
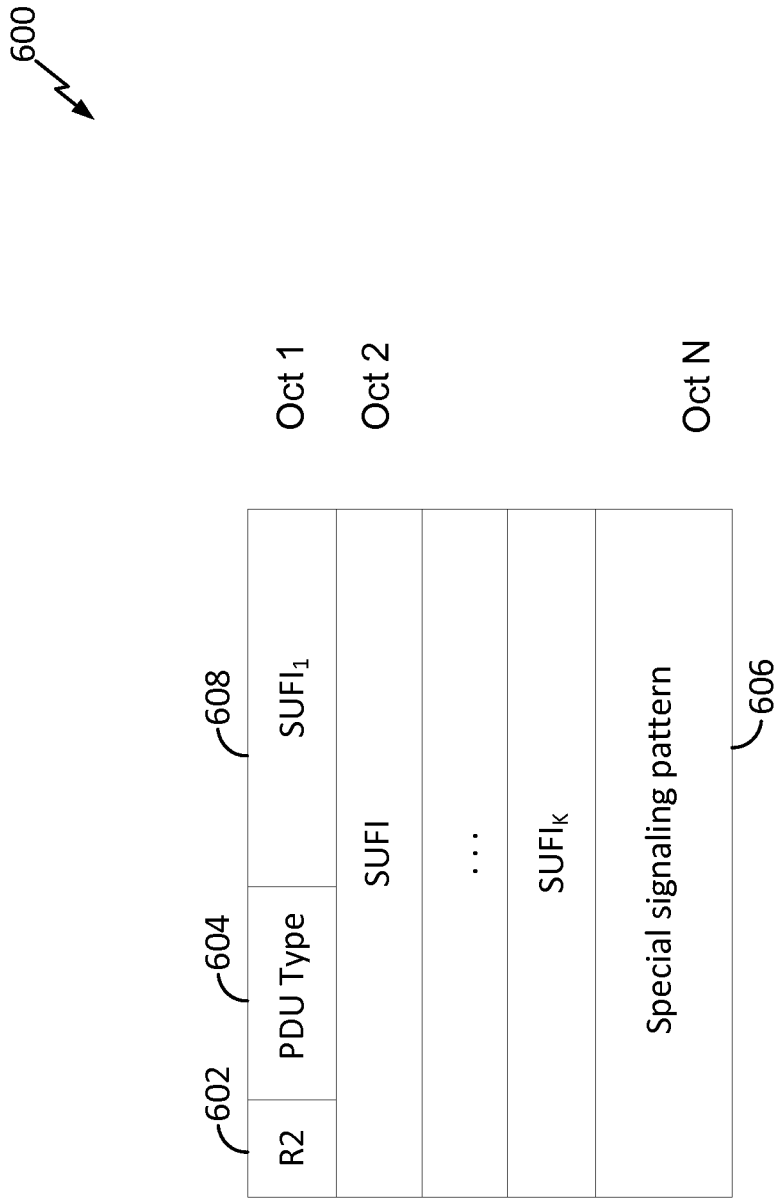
FIG. 6 is a conceptual diagram illustrating an RLC piggybacked status PDU with a data field repurposed to signal support of out-of-standard features/enhancements in accordance with an aspect of the disclosure.

FIG. 6 is a conceptual diagram illustrating an uplink RLC piggybacked status PDU 600 in accordance with an aspect of the disclosure. The piggybacked status PDU is a status PDU conveyed within a data PDU. The RLC piggybacked status PDU 600 has a R2 field 602, a PDU type field 604, a PAD field 606, and SUFI fields 608. The R2 field is a 1-bit reserved field and is always set to 0. The PDU type field is coded in 3 bits and indicates the type of control PDU (e.g., status, reset, or reset ACK). In this example, the PDU type field may be set to 000. The PAD field 606 contains a special signaling pattern (padding bits) to signal the out-of-standard features/enhancements, their relevant commands, and their relevant parameters. The SUFI fields 608 may be any suitable types, e.g., NO_MORE data, ACK, etc. The network receives the above specially padded RLC piggybacked status PDU 600 and decodes the special signaling pattern of the PAL) field 606 to determine the supported out-of-standard features/enhancements. In various aspects of the disclosure, the non-standard signaling approach illustrated in FIG. 6 may be applied in both uplink and downlink directions to communicate supported out-of-standard features/enhancements between the UE and the network.

Figure 7:
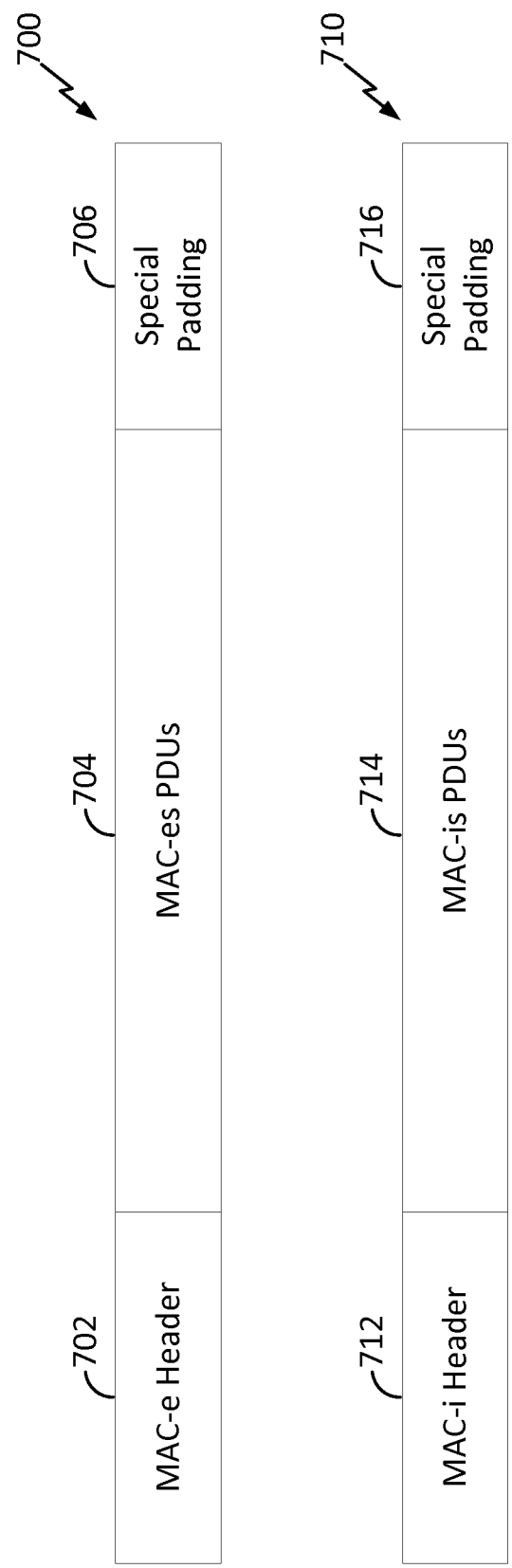
FIG. 7 is a simplified conceptual diagram illustrating a MAC-e PDU and a MAC-i PDU with a data field repurposed to signal support of out-of-standard features/enhancements in accordance with aspects of the disclosure.

In a third aspect of the disclosure, the UE 110 may borrow the padding bits of an uplink MAC-c/MAC-i PDU to signal out-of-standard features/enhancements, their relevant commands, and their relevant parameters. FIG. 7 is a simplified conceptual diagram illustrating a MAC-e PDU 700 and a MAC-i PDU 710 with a data field repurposed (borrowed) to signal support of out-of-standard features/enhancements in accordance with aspects of the disclosure. The MAC-e PDU 700 has a MAC-e header 702, a number of MAC-es PDUs 704, and an optional padding field 706. The padding field 706 contains a suitable number of padding bits to fit the current transport block size. Similarly, the MAC-i PDU 710 has a MAC-i header 712, a number of MAC-is PDUs 714, and an optional padding field 716. The padding field 716 contains a suitable number of padding bits to fit the current transport block size.

In an aspect of the disclosure, the padding field of the MAC-e PDU 700 or MAC-i PDU 702 may have a special signaling pattern (e.g., a predetermined pattern mutually agreed by the UE and the network in advance) to signal out-of-standard features/enhancements. That is the padding field 706 or 716 is repurposed for non-standard signaling. In one example, the specially padded MAC-e/i PDU may be sent once or more from the UE to the network. The padding bits with the special signaling pattern will be decoded by the network (e.g., Node-B/RNC) to trigger a certain out-of-standard features/enhancements, its relevant commands, and its relevant parameters. In various aspects of the disclosure, the special signaling approach illustrated in FIG. 7 may be applied in both uplink and downlink directions to communicate out-of-standard features/enhancements between the UE and the network.

The RLC based approaches of FIGS. 4-6 can be executed at an RNC 106, and the MAC based approach of FIG. 7 can be executed at an RNC 106 and or a Node-B 108. In various aspects of the disclosure, these approaches may be combined in a hybrid mechanism, where the RLC based approaches may be used for signaling out-of-standard features/enhancements involving the Node-B, RNC, and more; and the MAC based approach may be used for signaling out-of-standard features/enhancements only involving the Node-B.

In a fourth aspect of the disclosure, the UE 110 may send an uplink RLC control PDU 500 (see FIG. 5) with a repurposed/borrowed reserved PDU type in the PDU type field 508 to signal the support of out-of-standard features/enhancements. For example, in the current 3GPP standards, PDU types 011-111 are reserved. In various aspects of the disclosure, the UE may borrow any of the 011-111 reserved PDU types to signal a supported out-of-standard feature/enhancement. The RNC 106 will decode and populate such signaling to the Node-B/RNC to trigger a certain out-of-standard enhancement its relevant commands and parameters. The repurposed PDU type may be sent once or more from the UE to the network. In various aspects of the disclosure, this non-standard signaling approach using repurposed reserved PDU type may be applied in both uplink and downlink directions to communicate out-of-standard features/enhancements between the UE and the network.

In a fifth aspect of the disclosure, the UE 110 may send an uplink RLC control PDU 500 (see FIG. 5) with a repurposed/borrowed reserved SUFI type in the SUFI field 506 to signal the support of out-of-standard features/enhancements. In the current 3GPP standards, SUFI type 1001-1111 are reserved. In various aspects of the disclosure, the UE may repurpose/borrow any of the 1001-1111 reserved SUFI types to signal a supported out-of-standard feature/enhancement. The RNC 106 will decode and populate such signaling to the Node-B/RNC to trigger a certain out-of-standard enhancement with its relevant commands and its relevant parameters. The repurposed SUFI type may be sent once or more from UE to the network. In various aspects of the disclosure, this non-standard signaling approach using repurposed SUFI type may be applied in both uplink and downlink directions to communicate out-of-standard features/enhancements between the UE and the network.

In a sixth aspect of the disclosure, the UE 110 may send an RRC message with repurposed/borrowed dummy bits to signal the support of out-of-standard features/enhancements. According to the 3GPP RRC specification (e.g., 3GPP Technical Specification 25.331), some messages may include one or more information elements (IEs) named "dummy" that are included only in the Abstract Syntax Notation One (ASN.1). ASN.1 is a standard and notation that describes rules and structures for representing, encoding, transmitting, and decoding data in telecommunications and computer networking. In the current standards, the UE 110 should avoid sending IEs that are named "dummy" to the UTRAN 102. Likewise, the UTRAN should avoid sending IEs named "dummy" to the UE. If the UE receives an IE named "dummy," it shall ignore such IE and process the rest of the message as if the dummy IE was not included. The IE named "dummy" concerns an information element that was (erroneously) included in a previous version of the specification and has been removed by replacing it with a dummy of the same type.

Figure 8:
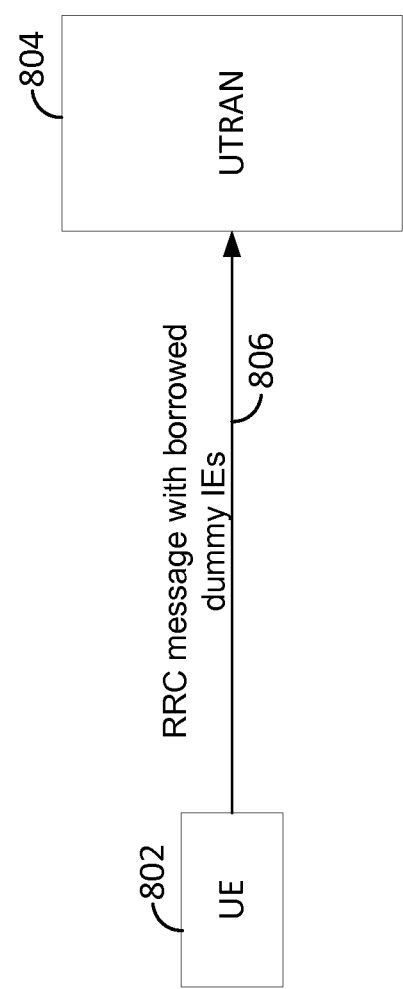
FIG. 8 is a conceptual diagram illustrating a UE and a UTRAN signaling out-of-standard features/enhancements by utilizing an RRC dummy IF in accordance with an aspect of the disclosure.

FIG. 8 is a conceptual diagram illustrating a UE 802 and a UTRAN 804 signaling out-of-standard features/enhancements by utilizing an RRC dummy IE in accordance with an aspect of the disclosure. The UE 802 may be the same as the UE 110, and the UTRAN 804 may be the same as the UTRAN 102. The UE 802 transmits repurposed/borrowed dummy IEs 806 to signal out-of-standard features/enhancements, their relevant commands, and their relevant parameters. Upon being mutually agreed by the UE and network implementations in advance, some dummy bits in the RRC ASN.1 may be borrowed/repurposed to signal out-of-standard features/enhancements, their relevant commands, and their relevant parameters. For example, the dummy IEs 806 may be set to various mutually agreed bit patterns to signal out-of-standard enhancements and features.

Figure 9:
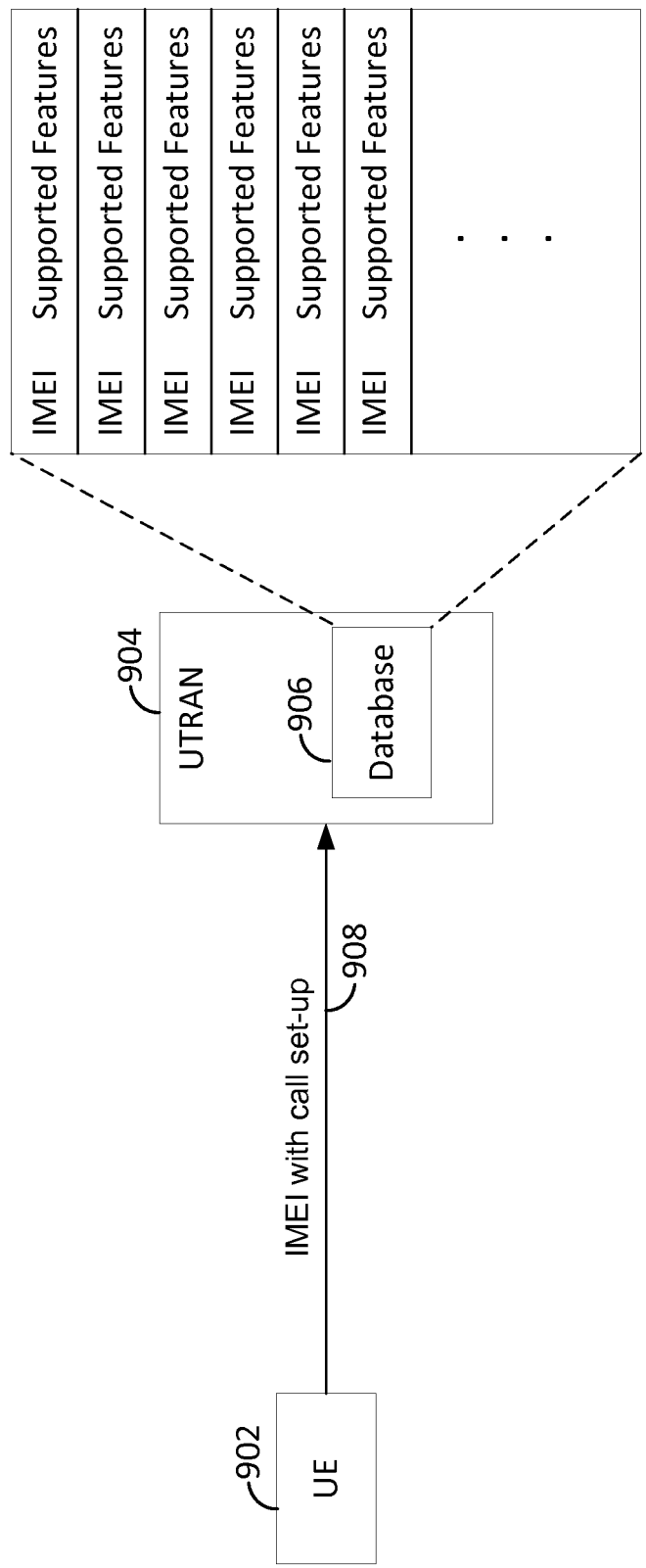
FIG. 9 is a conceptual diagram illustrating a UE and a UTRAN signaling out-of-standard features/enhancements by utilizing an International Mobile Station Equipment Identity (IMEI) number in accordance with an aspect of the disclosure.

In a seventh aspect of the disclosure, the network can use a device specific identification number to identify a certain UE that can support out-of-standard features/enhancements. For example, each 3GPP UE is identified by a unique International Mobile Station Equipment Identity (IMEI) number that includes information on the origin, model, and serial number of the device. FIG. 9 is a conceptual diagram illustrating a UE 902 and a UTRAN 904 signaling out-of-standard features/enhancements by utilizing an IMEI number in accordance with an aspect of the disclosure. The UE 902 may be the same as the UE 110, and the UTRAN 904 may be the same as the UTRAN 102. In an aspect of the disclosure, the UTRAN 904 maintains a database 906 that contains device identification numbers (e.g., IMEI numbers) of UEs supporting out-of-standard features/enhancements. During a call set-up, the UE 902 transmits its IMEI number 908 to the UTRAN 904. The UTRAN 904 compares the received IMEI number 908 to the entries in the database 906. If the UE's IMEI matches one of those stored in the database 906, the UTRAN 904 may enable, for example, its Node B and or RNC to support the corresponding out-of-standard features/enhancements.

Figure 10:
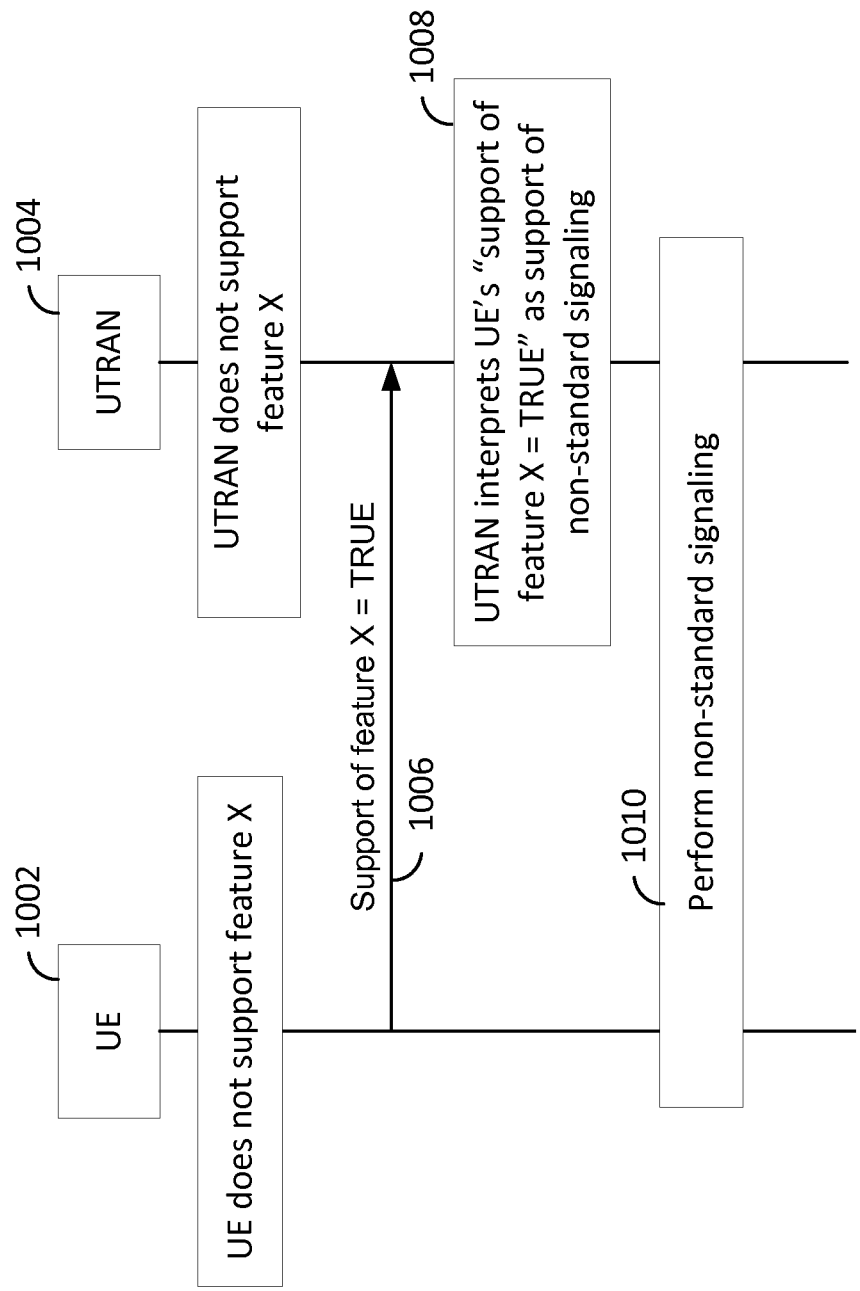
FIG. 10 is a conceptual diagram illustrating a two-step signaling approach between a UE and a UTRAN for signaling out-of-standard features/enhancements in accordance with an aspect of the disclosure.

The above-described signaling approaches in FIGS. 4-9 are one-step signaling approaches. In an eighth aspect of the disclosure, a two-step signaling approach may be used to signal out-of-standard features/enhancements. FIG. 10 is a conceptual diagram illustrating a two-step signaling approach between a UE 1002 and a UTRAN 1004 for signaling out-of-standard features/enhancements in accordance with an aspect of the disclosure. The UE 1002 may be the same as the UE 110, and the UTRAN 1004 may be the same as the UTRAN 102. Here, both the UE and UTRAN do not support a certain feature X (e.g., uplink open loop transmit diversity). In a first step, the UE sends an enhanced capability enabling message 1006 to signal that the UE can support non-standard signaling. The enhanced capability enabling message 1006 may confirm with a standard communication signaling protocol such as 3GPP access stratum (AS) RRC layer signaling or 3GPP non-access stratum (NAS) layer signaling. In some aspects of the disclosure, the enhanced capability enabling message 1006 may be an NAS layer message such as an Attach Accept message, an Attach Complete message, an Identity Request message, or an Identity Response message. (e.g., 3GPP Technical Specification 24.008).

In one example, the enhanced capability enabling message 1006 may be a UE capability report that indicates the UE can support feature X (i.e., support of feature X=TRUE). In fact, both the UE and the UTRAN do not actually support feature X, but the UE and UTRAN may mutually agree in advance to use this fictitious indication of support of feature X to signal the UE's support of non-standard signaling. At the UTRAN side 1008, it interprets the UE's fictitious support of feature X in the enhanced capability enabling message 1006 as a trigger to initiate non-standard signaling. Then, in a second step 1010, the LIE may use any of the one-step signaling approaches described in FIGS. 4-9 to communicate the supported out-of-standard features/enhancements. It should be noted that the various signaling approaches described above may be utilized by the UE or the UTRAN to signal out-of-standard features/enhancement, their relevant commands, and their relevant parameters in the uplink or downlink direction.

Figure 11:
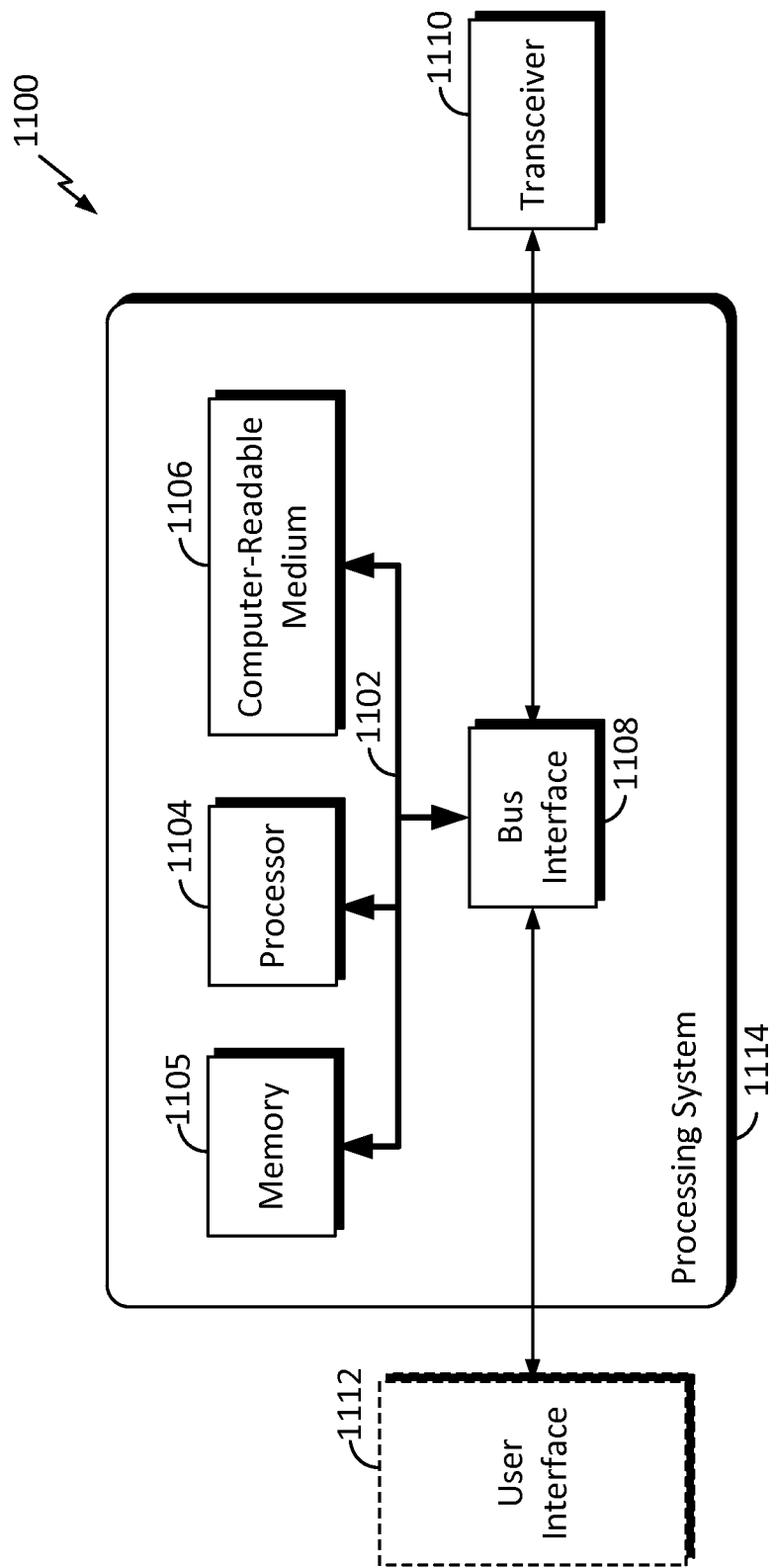
FIG. 11 is a block diagram illustrating an example of a hardware implementation for an apparatus employing a processing system in accordance with an aspect of the disclosure.

FIG. 11 is a conceptual diagram illustrating an example of a hardware implementation for an apparatus 1100 employing a processing system 1114. In accordance with various aspects of the disclosure, an element, or any portion of an element, or any combination of elements may be implemented with a processing system 1114 that includes one or more processors 1104. For example, the apparatus 1100 may be the UE as illustrated in any one or more of FIGS. 1, 2, 8, 9, and/or 10. In another example, the apparatus 1100 may be a radio network controller (RNC) or Node B in a UTRAN as illustrated in any one or more of FIGS. 1, 2, 8, 9, and/or 10. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 1104, as utilized in an apparatus 1100, may be used to implement any one or more of the processes described and illustrated in FIGS. 4-10.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable storage medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface for communicating with various other apparatus over a transmission medium. Depending upon the nature of the apparatus, a user interface 1112 (e.g., keypad, display, speaker, microphone, joystick) may also be provided.

Figure 12:
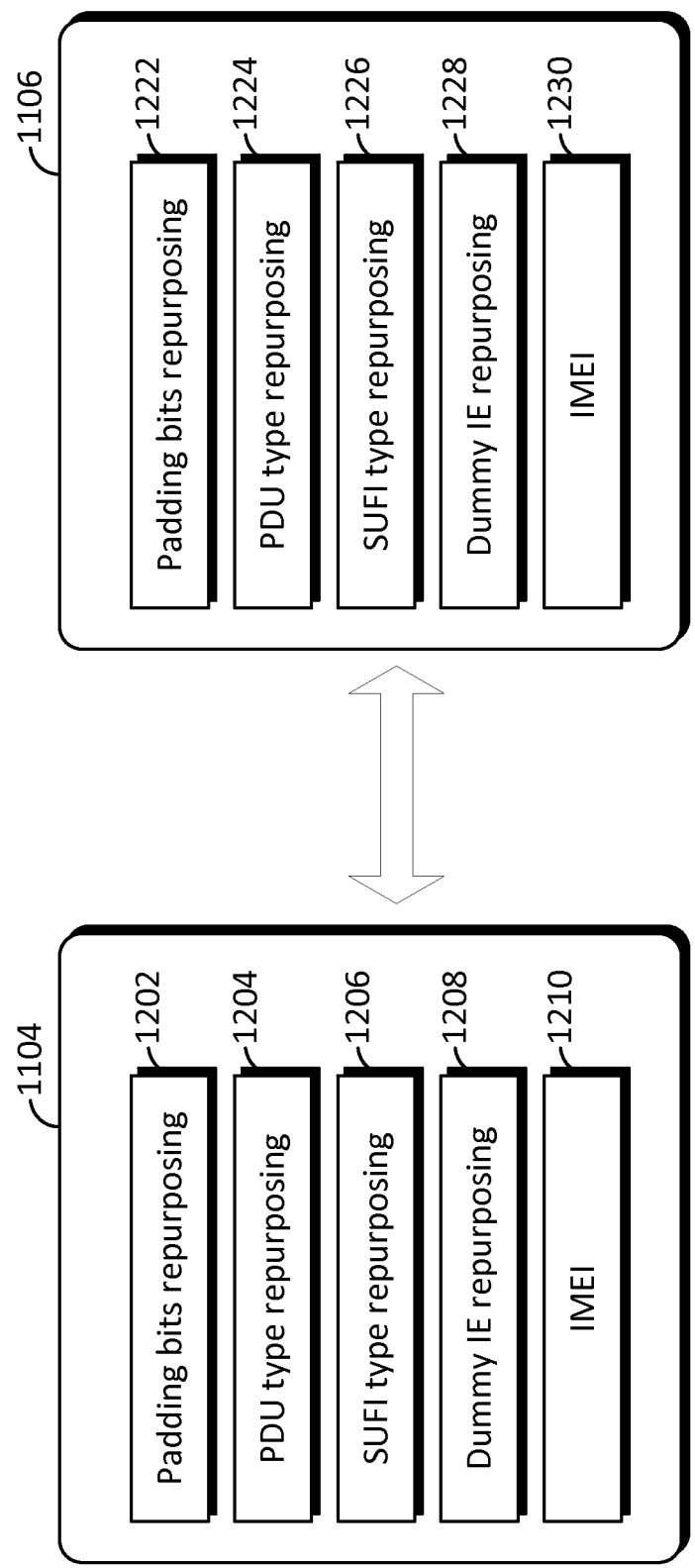
FIG. 12 is a conceptual diagram illustrating a processor and a computer-readable storage medium of FIG. 11 in more detail in accordance with an aspect of the disclosure.

FIG. 12 is a conceptual diagram illustrating the processor 1104 and computer-readable storage medium 1106 in more detail in accordance with an aspect of the disclosure. The processor 1104 may include padding bits repurposing circuitry 1202, PDU type repurposing circuitry 1204, SUFI type repurposing circuitry 1206, dummy IE repurposing circuitry 1208, and IMEI circuitry 1210. The computer-readable storage 1106 may include a padding bits repurposing routine 1222, a PDU type repurposing routine 1224, a SUFI type repurposing routine 1226, a dummy IE repurposing routine 1228, and an IMEI routine 1230. In various aspects of the disclosure, the processor 1104 may execute these routines to configure these circuitries to perform the various processes and functions illustrated in FIGS. 4-10. These circuitries and routines will be described in more detail below in reference to FIGS. 13 and 14.

The processor 1104 is responsible for managing the bus 1102 and general processing, including the execution of software stored on the computer-readable storage medium 1106. The software, when executed by the processor 1104, causes the processing system 1114 to perform the various functions described infra for any particular apparatus. The computer-readable storage medium 1106 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1106. The computer-readable storage medium 1106 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1106 may reside in the processing system 1114, external to the processing system 1114, or distributed across multiple entities including the processing system 1114. The computer-readable storage medium 1106 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

Figure 13:
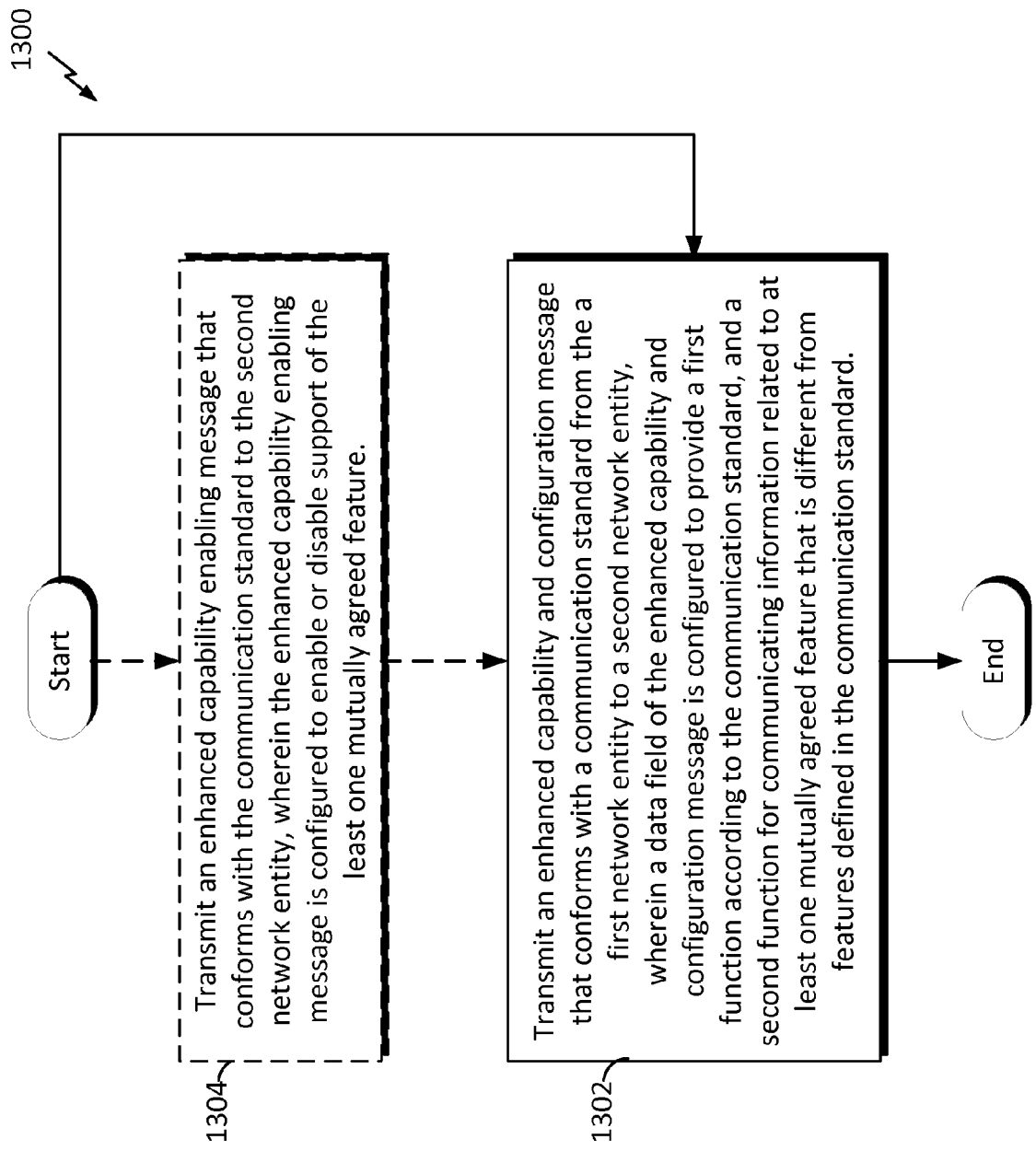
FIG. 13 is a flowchart illustrating a method of signaling support of out-of-standard features by repurposing a data field of an enhanced capability and configuration message in accordance with an aspect of the disclosure.

FIG. 13 is a flowchart illustrating a method 1300 of signaling support of out-of-standard (non-standard) features/enhancements by repurposing a data field of an enhanced capability enabling message in accordance with an aspect of the disclosure. The method 1300 may be implemented with the UE 110 and the UTRAN 102. Referring to FIG. 13, a first network entity (e.g., the UE 110) transmits an enhanced capability and configuration message (e.g., PDU 400, 500, 600, 700, 710, or dummy IE 806) that conforms with a communication standard (e.g., UTRAN standard) to a second network entity (e.g., the network or UTRAN 102) (see block 1302). A data field of the enhanced capability and configuration message is configured to provide a first function according to the communication standard, and a second function for communicating information related to or support of at least one mutually agreed feature (out-of-standard features/enhancements) that is different from features defined in the communication standard. That is, the data field of the enhanced capability and configuration message, while maintaining conformity with its communication standard, is additionally repurposed to communicate information, parameters, and/or support of features/enhancements not defined or supported in the communication standard by which the first network entity communicates with the second network entity.

In various aspects of the disclosure, the enhanced capability and configuration message may be an RLC control PDU, an RLC data. PDU, a MAC-e/i PDU, or an RRC PDU. For example, the UE (first network entity) may execute the padding bits repurposing routine 1222 to configure the padding bits repurposing circuitry 1202 to repurpose the padding bits of an RLC control/data PDU or MAC-e/i PDU to signal support of out-of-standard features/enhancements. The UE may execute the PDU type repurposing routine 1224 to configure the PDU type repurposing circuitry 1204 to repurpose a reserved PDU type of an RLC status (or piggybacked) PDU to signal support of out-of-standard features/enhancements. The UE may execute the SUFI type repurposing routine 1226 to configure the SUFI type repurposing circuitry 1206 to repurpose a reserved SUFI type to signal support of out-of-standard features/enhancements. The UE may execute the dummy information element (IE) repurposing routine 1228 to configure the dummy 1E repurposing circuitry 1208 to repurpose an RRC dummy IL to signal support of out-of-standard features/enhancements, Referring back to FIG. 13, in a two-step signaling approach, prior to transmitting the enhanced capability and configuration message to signal support of at least one mutually agreed non-standard sanctioned feature (see block 1302), the first network entity may optionally transmit an enhanced capability enabling message that conforms with the communication standard to the second network entity (block 1304). This enhanced capability enabling message is configured to enable or disable support of the least one mutually agreed feature. In one example, the enhanced capability enabling message may be the message 1006 (e.g., an RRC UE capability report) that includes a capability flag fictitiously indicating support of a feature by both the UE and the network.

Figure 14:
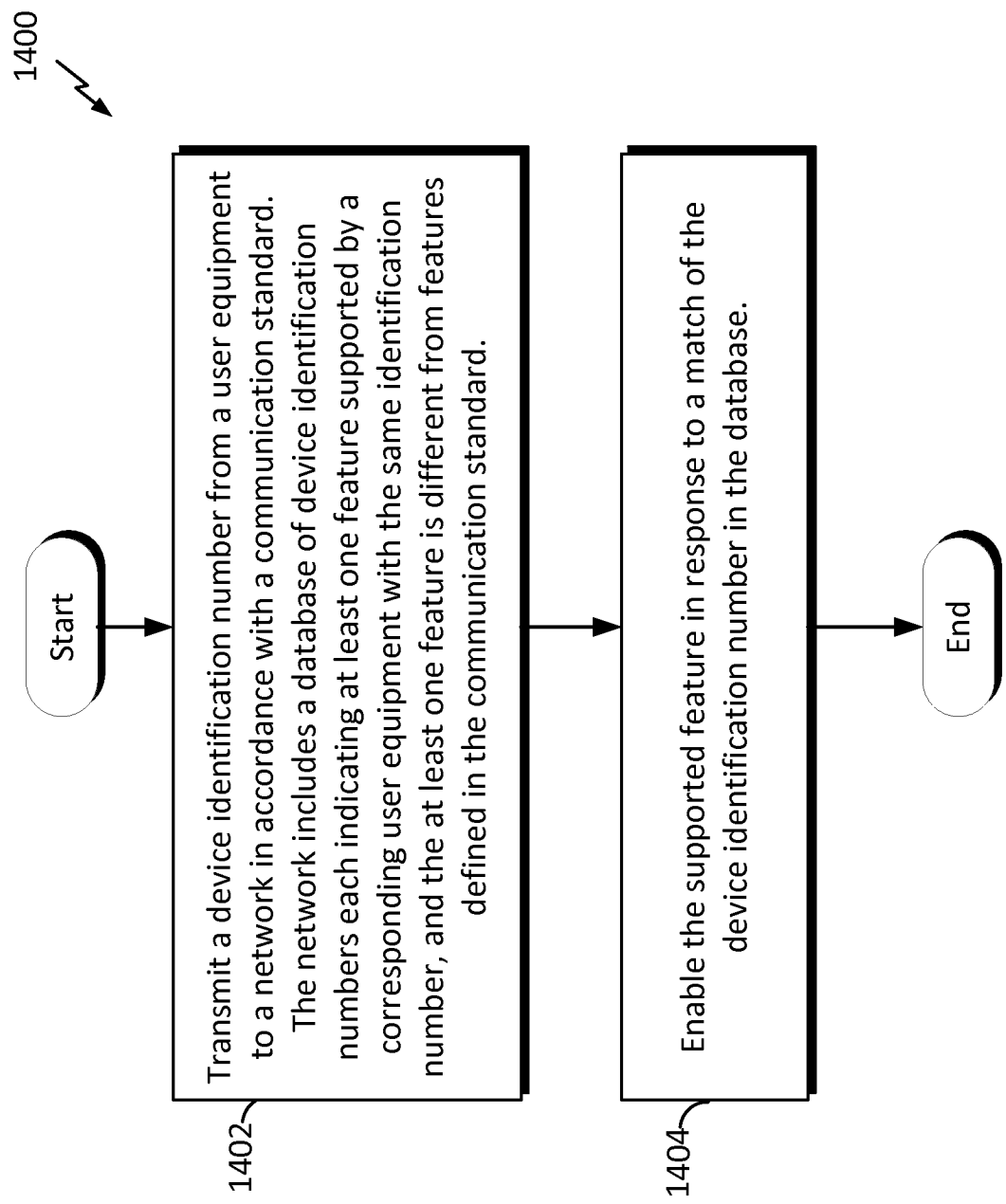
FIG. 14 is a flowchart illustrating a method of signaling support of out-of-standard features using a unique device identification number in accordance with an aspect of the disclosure.

FIG. 14 is a flowchart illustrating a method 1400 of signaling support of out-of-standard features using a unique device identification number in accordance with an aspect of the disclosure. In some examples, the method 1400 may be implemented with the UE 110 and the UTRAN 102. In a first step 1402, a UE transmits a device identification number (e.g., IMEI 908 of FIG. 9) to a UTRAN (network) in accordance with a communication standard (e.g., UTRAN standard). The UTRAN includes a database (e.g., database 906 of FIG. 9) of device identification numbers each indicating at least one feature supported by a corresponding UE with the same identification number. The at least one feature is different from features defined or supported in the communication standard by which the UE communicates with the network. In a second step 1404, the UE enables the supported non-standard sanctioned feature in response to a match of the device identification number in the database. The non-standard sanctioned feature is not defined or supported in the communication standard by which the UE communicates with the UTRAN. For example, the UE may execute the IMEI routine 1230 to configure the IMEI circuitry 1210 to transmit the IMEI number to the network. While the methods 1300 and 1400 are described with the UE initiating the communication, these methods may be equally applicable in applications with the network initiating the communication. That is, these methods may be applied in the uplink or downlink directions.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of signaling in a wireless communication network, comprising:
 transmitting an enhanced capability and configuration message that conforms with a communication standard from a first network entity to a second network entity,
 wherein a data field of the enhanced capability and configuration message, while maintaining conformity with the communication standard, is repurposed to communicate information related to at least one mutually agreed feature that is not defined in the communication standard, and recognized by the first network entity and the second network entity before transmitting the enhanced capability and configuration message, and
 wherein the repurposed data field comprises at least one of a plurality of padding bits, a reserved PDU type, a reserved Super Field (SUFI) type, or a Radio Resource Control (RRC) dummy Information Element.

2. The method of claim 1, further comprising
 prior to transmitting the enhanced capability and configuration message, transmitting an enhanced capability enabling message that conforms with the communication standard to the second network entity, wherein the enhanced capability enabling message is configured to enable or disable support of the at least one mutually agreed feature.

3. The method of claim 2, wherein the enhanced capability enabling message comprises an access stratum layer message or a non-access stratum layer message.

4. The method of claim 2,
wherein the enhanced capability enabling message comprises a Radio Resource Control (RRC) User Equipment (UE) capability report, and
wherein the RRC UE capability report comprises a capability flag fictitiously indicating support of a feature by both the first network entity and the second network entity, and thereby enabling support of the at least one mutually agreed feature.

5. The method of claim 1, wherein the enhanced capability and configuration message comprises at least one of a Radio Link Control (RLC) data PDU, an RLC control PDU, a Media. Access Control (MAC) PDU, or a Radio Resource Control (RRC) PDU.

6. The method of claim 1, wherein the padding bits are encoded to communicate information related to the at least one mutually agreed feature.

7. The method of claim 1, wherein the reserved PDU type is configured to communicate information related to the at least one mutually agreed feature.

8. The method of claim 1, wherein the reserved Super Field (SUFI) is configured to communicate information related to the at least one mutually agreed feature.

9. The method of claim 1, wherein the Radio Resource Control (RRC) dummy Information Element is configured to communicate information related to the at least one mutually agreed feature.

10. The method of claim 1, wherein the first network entity comprises a user equipment, a Node B, or a Radio Network Controller (RNC).

11. A method of signaling in a wireless communication network, comprising:
receiving, at a network node, a device identification number from a user equipment of a network in accordance with a communication standard;
maintaining, at the network node, a database of device identification numbers each indicating at least one out-of-standard feature supported by a corresponding user equipment with the same identification number,
wherein the at least one out-of-standard feature is different from features defined in the communication standard; and
enabling, at the network node, the supported feature in response to a match of the device identification number in the database.

12. The method of claim 11, wherein the device identification number comprises an International Mobile Station Equipment Identity (IMEI) number.

13. The method of claim 11, wherein the user equipment is configured to communicate in a Universal Mobile Telecommunications System (UMTS) network, and the network comprises a UMTS Terrestrial Radio Access Network (UTRAN).

14. An apparatus for wireless communication, comprising:
at least one processor;
a communication interface coupled to the at least one processor; and
a memory coupled to the at least one processor,
wherein the at least one processor comprises first circuitry configured to transmit an enhanced capability and configuration message that conforms with a communication standard to a network entity, and
wherein a data field of the enhanced capability and configuration message, while maintaining conformity with the communication standard is repurposed to communicate information related to at least one mutually agreed feature that is not defined in the communication standard, and recognized by the apparatus and the network entity before transmitting the enhanced capability and configuration message, and
wherein the repurposed data field comprises at least one of a plurality of padding bits, a reserved PDU type, a reserved Super Field (SUFI) type, or a Radio Resource Control (RRC) dummy information Element.

15. The apparatus of claim 14, further comprising
second circuitry, prior to transmitting the enhanced capability and configuration message, configured to transmit an enhanced capability enabling message that confirms with the communication standard to the network entity,
wherein the enhanced capability enabling message is configured to enable or disable support of the at least one mutually agreed feature.

16. The apparatus of claim 15, wherein the enhanced capability enabling message comprises an access stratum layer message or a non-access stratum layer message.

17. The apparatus of claim 15,
wherein the enhanced capability enabling message comprises a Radio Resource Control (RRC) User Equipment (UE) capability report, and
wherein the RRC UE capability report comprises a capability flag fictitiously indicating support of a feature by both the apparatus and the network entity, and thereby enabling support of the at least one mutually agreed feature.

18. The apparatus of claim 14, wherein the enhanced capability and configuration message comprises at least one of a Radio Link Control (RLC) data PDU, an RLC control PDU, a Media Access Control (MAC) PDU, or a Radio Resource Control (RRC) PDU.

19. The apparatus of claim 14, wherein the padding bits are encoded to communicate information related to the at least one mutually agreed feature.

20. The apparatus of claim 14, wherein the reserved PDU type is configured to communicate information related to the at least one mutually agreed feature.

21. The apparatus of claim 14, wherein the reserved Super Field (SUFI) type is configured to communicate information related to the at least one mutually agreed feature.

22. The apparatus of claim 14, wherein the Radio Resource Control (RRC) dummy Information Element is configured to communicate information related to the at least one mutually agreed feature.

23. The apparatus of claim 14, wherein the apparatus comprises a user equipment, a Node B, or a Radio Network Controller (RNC).

24. A network node for wireless communication, comprising:
at least one processor;
a communication interface coupled to the at least one processor; and
a memory coupled to the at least one processor,
wherein the at least one processor comprises:
first circuitry configured to receive a device identification number from a user equipment of a network in accordance with a communication standard, and maintain a database of device identification numbers each indicating at least one out-of-standard feature supported by a corresponding user equipment with the same identification number; and second circuitry configured to enable the supported feature in response to a match of the device identification number in the database, wherein the at least one out-of-standard feature is different from features defined in the communication standard.

25. The network node of claim 24, wherein the device identification number comprises an International Mobile Station Equipment Identity (IMEI) number.

26. The network node of claim 24, wherein the user equipment is configured to communicate in a Universal Mobile Telecommunications System (UMTS) network, and the network comprises a UMTS Terrestrial Radio Access Network (UTRAN).

* * * * *